(12) United States Patent
Soliman

(10) Patent No.: US 12,473,501 B2
(45) Date of Patent: Nov. 18, 2025

(54) RECYCLING OF WASTE ENERGY AND DESALTER EFFLUENT WATER FOR INDUSTRIAL REUSE

(71) Applicant: SAUDI ARABIAN OIL COMPANY, Dhahran (SA)

(72) Inventor: Mohamed Ahmed Soliman, Ras Tanura (SA)

(73) Assignee: Saudi Arabian Oil Company, Dhahran (SA)

( * ) Notice: Subject to any disclaimer, the term of this patent is extended or adjusted under 35 U.S.C. 154(b) by 182 days.

(21) Appl. No.: 18/583,759

(22) Filed: Feb. 21, 2024

(65) Prior Publication Data
US 2024/0191145 A1    Jun. 13, 2024

Related U.S. Application Data

(62) Division of application No. 17/220,700, filed on Apr. 1, 2021, now Pat. No. 11,939,536.

(51) Int. Cl.
*C10G 31/00* (2006.01)
*B01D 1/00* (2006.01)
(Continued)

(52) U.S. Cl.
CPC ........... *C10G 31/08* (2013.01); *B01D 1/0058* (2013.01); *B01D 3/346* (2013.01); *B01D 19/0036* (2013.01); *C10G 2300/4081* (2013.01)

(58) Field of Classification Search
CPC ........... C10G 31/08; C10G 2300/4081; B01D 19/0036; B01D 1/0058; B01D 3/346; B01D 17/0214
See application file for complete search history.

(56) References Cited

U.S. PATENT DOCUMENTS 10,023,811 B2    7/2018    Soliman et al.
10,119,080 B2    11/2018   Albert et al.
(Continued)

FOREIGN PATENT DOCUMENTS

WO    2011098478 A1    8/2011
WO    2020043813 A1    3/2020

OTHER PUBLICATIONS

Engineering Encyclopedia, "Introduction to SA Process Plants, Facilities and Equipment", Gas Oil Separation Plants, 17 pages.
(Continued)

*Primary Examiner* — Prem C Singh
*Assistant Examiner* — Brandi M Doyle
(74) *Attorney, Agent, or Firm* — Bracewell LLP; Constance G. Rhebergen; Eleanor T. Porter

(57) ABSTRACT

Systems and methods for crude oil desalting technology are provided. More specifically, systems and methods for the usage of waste heat from compression to treat high salinity water are provided. The systems and methods generate recycled water streams for desalter treatment. The systems and methods can treat high salinity waters from desalters and dehydrators. The high salinity streams are introduced to the compressed gas streams, where the waste heat causes the water portion of the water streams to evaporate, resulting in a fully or near-saturated gas stream and a concentrated waste water stream. The saturated gas streams are cooled and condensed, and low TDS water is separated from the gas stream in knockout drums. The low TDS water can be reintroduced to the desalting system as wash water, generating a circular water reuse.

12 Claims, 4 Drawing Sheets

(51) Int. Cl.
*B01D 3/34* (2006.01)
*B01D 19/00* (2006.01)
*C10G 31/08* (2006.01)

(56) References Cited

U.S. PATENT DOCUMENTS

| | | |
|---|---|---|
| 10,240,098 B2 | 3/2019 | Randhava et al. |
| 10,260,010 B2 | 4/2019 | Soliman |
| 10,350,515 B2 | 7/2019 | Al-Shafei et al. |
| 10,619,468 B2 | 4/2020 | Lawson et al. |
| 10,703,989 B2 | 7/2020 | Koleshwar et al. |
| 2009/0242384 A1 | 10/2009 | Curcio et al. |
| 2018/0119031 A1 | 5/2018 | Haworth et al. |

OTHER PUBLICATIONS

Engineering Standard, "Gas Oil Separation Plants", GOSPs, SAES-A-010, Feb. 26, 2013, 32 pages.

Havard Devold, "An Introduction to Oil and Gas Production", ABB Oil and Gas Production Handbook, ABB Oil & Gas, Oslo, Aug. 2013, 162 pages.

RECYCLING OF WASTE ENERGY AND DESALTER EFFLUENT WATER FOR INDUSTRIAL REUSE

PRIORITY

The present application is a divisional application of and claims priority to and the benefit of U.S. patent application Ser. No. 17/220,700, filed on Apr. 1, 2021, the entire disclosure of which is incorporated here by reference.

FIELD

This disclosure relates to systems and methods for crude oil desalting technology. More specifically, this disclosure relates to treating high salinity water, generating recycled water stream.

BACKGROUND

In general, a gas oil separation plant is a continuous separation process used to refine crude oil, which includes a high pressure production trap (HPPT), a low pressure production trap (LPPT), a low pressure degassing tank (LPDT), a dehydrator unit, at least one desalting unit, a water/oil separation plant (WOSEP), a stabilizer column, centrifugal pumps, heat exchangers, and reboilers. In a GOSP, vessel pressure is often reduced in several stages to allow for the controlled separation of volatile components, such as entrained vapors and gases. Goals of a GOSP include achieving maximum liquid recovery with stabilized oil separated from gas, and water separated from gases and oil. In other words, one purpose of a GOSP is to remove water, salt, and volatile hydrocarbon gases from wet crude oil after it is obtained from a hydrocarbon-bearing reservoir.

However, a large pressure reduction in a single separator will cause flash vaporization, leading to instability and safety hazards. Thus, in conventional GOSP's, many stages and units are required. In a first stage, gas, crude oil, and free water are separated in various stages. In conventional systems, the separated gas is compressed and sent for further treatment. In a second stage, crude oil is dehydrated and desalted to separate emulsified water and salt to meet certain basic sediment and water (BSW) specifications. In a third stage, crude oil is stabilized and sweetened to meet hydrogen sulfide ($H_2S$) and Reid Vapor Pressure (RVP) specifications.

Prior art GOSP systems suffer from the following issues: large fresh water demand; generation of significant quantities of produced water or wastewater contaminated with salt, dissolved solids, and oil; off-specification crude oil production in terms of BSW and salt content; high operating costs required to meet the crude specifications; and inefficient human and manual operations; and high operating costs required to meet the crude specifications. Additionally, conventional GOSP and desalting operations generate large quantities of water that can be difficult to recycle and treat, especially high salinity produced water or wastewater. Therefore, methods and systems to improve GOSP operation is needed.

SUMMARY

This disclosure relates to systems and methods for crude oil desalting technology. More specifically, this disclosure relates to using waste heat from compression to treat high salinity water, generating recycled water streams for desalter treatment. In GOSP systems, separated gas undergoes compression, generating waste heat. In the invention disclosed herein, water with high levels of total dissolve solids (TDS), including high salinity waters from desalters and dehydrators, are introduced to the compressed gas streams, where the waste heat causes the water portion of the high TDS water streams to evaporate, resulting in a fully or near-saturated gas stream and a concentrated waste water stream. The saturated gas streams are cooled and condensed, and low TDS water is separated from the gas stream in knockout drums. The low TDS water can be reintroduced to the desalting system as wash water, generating a circular recycle of water usage.

Therefore, disclosed is a method for generating low salinity water for crude oil treatment processes for a continuous water recycle loop. The method includes the steps of separating a gas stream from an inlet crude stream in a gas oil separator vessel, compressing the gas stream in a gas compressor to generate a compressed gas stream, and introducing the compressed gas stream to a water separation vessel. The method also includes the step of introducing a high salinity stream containing water and salt and having a high salinity concentration to the water separation vessel. The method further includes the step of contacting the compressed gas stream with the high salinity stream in the water separation vessel, so that heat transfers from the compressed gas stream to the high salinity stream wherein water from the high salinity stream evaporates, generating water vapor, so that the compressed gas stream near saturation with water. The method also includes the steps of removing a saturated gas stream from the water separation vessel, removing a waste stream from the water separation vessel. The waste stream includes water and salt and has a waste stream salinity concentration greater than the high salinity concentration. The method also includes the steps of cooling the saturated gas stream in an aftercooler to generate a cooled saturated gas stream, so that water condenses from the saturated gas stream; and separating a low salinity water stream from the saturated gas stream in a knockout drum to generate an export gas stream.

In some embodiments, the method also includes the step of treating a crude desalting feed stream with the low salinity water stream in a desalting vessel operable to remove salt from the crude desalting feed stream. In further embodiments, the high salinity stream includes a desalting vessel wash water stream, so that the high salinity stream is generated from the desalting vessel and treated in the water separation vessel to generate the low salinity water stream that is recycled to the desalting vessel. In some embodiments, the water separation vessel includes a humidifier operable to distribute the high salinity stream through the compressed gas stream. In other embodiments, the step of introducing the high salinity stream to the water separation vessel further includes the steps of introducing the high salinity stream to the compressed gas stream to generate a combined stream, mixing the combined stream in a mixing valve to generate a mixed stream, and introducing the mixed stream to the water separation vessel.

In further embodiments, the water separation vessel is selected from the group consisting of a humidifier, a flash vessel, a hydrocyclone, and combinations of the same. In some embodiments, the method further includes the steps of collecting the low salinity water stream in a low salinity tank, and recycling the low salinity water stream in a crude treatment process as an industrial use stream. In some embodiments, the low salinity water stream has a low salinity water stream dissolved solids concentration less than 200 ppm.

Further disclosed is a system for generating low salinity water for crude oil treatment processes. The system includes a gas oil separator vessel operable to separate a gas stream containing gaseous hydrocarbons from an inlet crude stream, and a gas compressor fluidly connected to the gas oil separator vessel operable to compress the gas stream to generate a compressed gas stream. The system also includes a water separation vessel fluidly connected to the gas compressor operable to contact the compressed gas stream with a high salinity stream containing water and salt, so that heat transfers from the compressed gas stream to the high salinity stream. Water from the high salinity stream evaporates generating water vapor, so that the compressed gas stream nears saturation with water, so that the water separation vessel generates a waste stream containing water and salt and a saturated gas stream containing water vapor and gaseous hydrocarbons. The system also includes an aftercooler fluidly connected to the water separation vessel operable to cool the saturated gas stream to generate a cooled saturated gas stream, and a knockout drum fluidly connected to the aftercooler operable to separated condensed water from the cooled saturated gas stream to generate an export gas stream and a low salinity water stream.

In some embodiments, the system also includes a mixing valve fluidly connected to the gas compressor and the water separation vessel operable to mix the high salinity stream and the compressed gas stream to generate a mixed stream before the mixed stream is introduced to the water separation vessel. In further embodiments, the system includes a low salinity tank fluidly connected to the knockout drum operable to collect the low salinity water stream and a residual low salinity water stream. In some embodiments, the system also includes a desalting vessel fluidly connected to the gas oil separator vessel. The desalting vessel is operable to accept a mixed desalting feed stream containing a desalting wash water feed stream and a crude desalting feed stream. The crude desalting feed stream is generated from the gas oil separator vessel, and the desalting vessel is further operable to generate a desalted crude stream and a desalting vessel wash water stream. In some embodiments, the desalting wash water feed stream includes the low salinity water stream. In some embodiments, the high salinity stream includes the desalting vessel wash water stream. In some embodiments, the water separation vessel is selected from the group consisting of a humidifier, a flash vessel, a hydrocyclone, and combinations of the same.

Further disclosed is a system for crude oil treatment. The system includes a high pressure production trap operable to separate a high pressure gas stream containing gaseous hydrocarbons from an inlet crude stream to generate a high pressure crude stream. The system also includes a low pressure production trap fluidly connected to the high pressure production trap operable to separate a low pressure gas stream containing gaseous hydrocarbons from the high pressure crude stream to generate a low pressure crude stream and a low pressure gas stream containing hydrocarbons. The system also includes a low pressure degassing tank fluidly connected to the low pressure production trap operable to separate a degassing tank gas stream containing gaseous hydrocarbons from the low pressure crude stream. The system further includes a first compressor fluidly connected to the high pressure production trap, operable to compress the high pressure gas stream to generate a compressed high pressure gas stream.

The system also includes a first separation vessel fluidly connected to the first compressor operable to contact a first high salinity stream containing water and salt and the compressed high pressure gas stream so that water vapor is created to generate a first waste stream containing water and salt and a first saturated gas stream containing water vapor and gaseous hydrocarbons. The system includes a first aftercooler fluidly connected to the first separation vessel operable to cool the compressed high pressure gas stream to generate a cooled first saturated gas stream, and a first knockout drum fluidly connected to the first aftercooler operable to separate a first low salinity water stream containing water from the cooled first saturated gas stream, to generate a first export gas stream containing gaseous hydrocarbons. The system also includes a second compressor fluidly connected to the low pressure production trap operable to compress the low pressure gas stream to generate a compressed low pressure gas stream, a second separation vessel fluidly connected to the first compressor operable to contact a second high salinity stream containing water and salt and the compressed low pressure gas stream such that water vapor is created to generate a second waste stream containing water and salt and a second saturated gas stream containing water vapor and gaseous hydrocarbons. The system also includes a second aftercooler fluidly connected to the second separation vessel operable to cool the compressed low pressure gas stream to generate a cooled second saturated gas stream, and a second knockout drum fluidly connected to the second aftercooler operable to separate a second low salinity water stream containing water from the cooled second saturated gas stream to generate a second export gas stream containing gaseous hydrocarbons. The system also includes a third compressor fluidly connected to the low pressure degassing tank operable to compress the degassing tank gas stream to generate a compressed degassing tank gas stream, and a third separation vessel fluidly connected to the third compressor, the third separation vessel operable to contact a third salinity stream containing water and salt and the compressed degassing tank gas stream such that water vapor is created to generate a third waste stream containing water and salt and a third saturated gas stream containing water vapor and gaseous hydrocarbons. The system also includes a third aftercooler fluidly connected to the third separation vessel operable to cool the compressed degassing tank gas stream to generate a cooled third saturated gas stream, and a third knockout drum fluidly connected to the third aftercooler operable to separate a third low salinity water stream containing water from the cooled third saturated gas stream to generate a third export gas stream containing gaseous hydrocarbons.

In some embodiments, the system also includes a dehydrator fluidly connected to the low pressure degassing tank operable to accept a dehydrator feed stream including a desalter wash water stream and the degassing tank crude stream, the dehydrator further operable to generate a crude desalter feed stream and a dehydrator waste water stream so that salts and dissolved solids from the degassing tank crude stream are removed from the degassing tank crude stream and transferred to the dehydrator waste water stream. The system also includes a desalter unit, fluidly connected to the dehydrator unit operable to accept a mixed desalter feed stream containing the first low salinity stream, the second low salinity stream, the third low salinity stream, the desalter wash water stream, and the crude desalter feed stream. The desalter unit is further operable to generate a desalter crude stream and the desalter wash water stream so that salts and dissolved solids from the crude desalter feed stream are removed from the crude desalter feed stream and transferred to the desalter wash water stream.

In further embodiments, the second export gas stream and the third export gas stream are recycled to the first compressor. In some embodiments, the system also includes a first mixing valve operable to mix the first high salinity stream with the compressed high pressure gas stream before introduction to the first separation vessel; a second mixing valve operable to mix the second high salinity stream with the compressed low pressure gas stream before introduction to the second separation vessel; and a third mixing valve operable to mix the third high salinity stream with the compressed degassing tank gas stream before introduction to the third separation vessel. In some embodiments, the first separation vessel, the second separation vessel, and the third separation vessel are each selected from the group consisting of a humidifier, a flash vessel, a hydrocyclone, and combinations of the same.

BRIEF DESCRIPTION OF THE DRAWINGS

These and other features, aspects, and advantages of the present disclosure will become better understood with regard to the following descriptions, claims, and accompanying drawings. It is to be noted, however, that the drawings illustrate only several embodiments of the disclosure and are therefore not to be considered limiting of the scope as it can admit to other equally effective embodiments.

In the accompanying Figures, similar components or features, or both, can have a similar reference label. For the purpose of the simplified schematic illustrations and descriptions of FIGS. 1 through 4, the numerous pumps, valves, temperature and pressure sensors, electronic controllers, and the like that can be employed and well known to those of ordinary skill in the art are not included. Further, accompanying components that are in conventional industrial operations are not depicted. However, operational components, such as those described in the present disclosure, can be added to the embodiments described in this disclosure.

DETAILED DESCRIPTION

While the disclosure will be described with several embodiments, it is understood that one of ordinary skill in the relevant art will appreciate that many examples, variations and alterations to the systems and methods described are within the scope and spirit of the disclosure. Accordingly, the embodiments of the disclosure described are set forth without any loss of generality, and without imposing limitations, on the claims.

Advantages of the present disclosure include the treatment of difficult to treat streams through evaporation, including high-salinity and high TDS waste water stream. These streams can come from the desalter and dehydrator systems, resulting in a "closed loop" system (or a continuous water recycle loop, where water is treated in the same GOSP as where it is generated. The treated water can then be reused as a fresh water or treated water source, including being used in the desalters and dehydrators in the same GOSP system. Advantageously, the reuse of the treated water reduces the need for fresh water. Additionally, the system utilizes waste heat that may otherwise be wasted.

Figure 1:
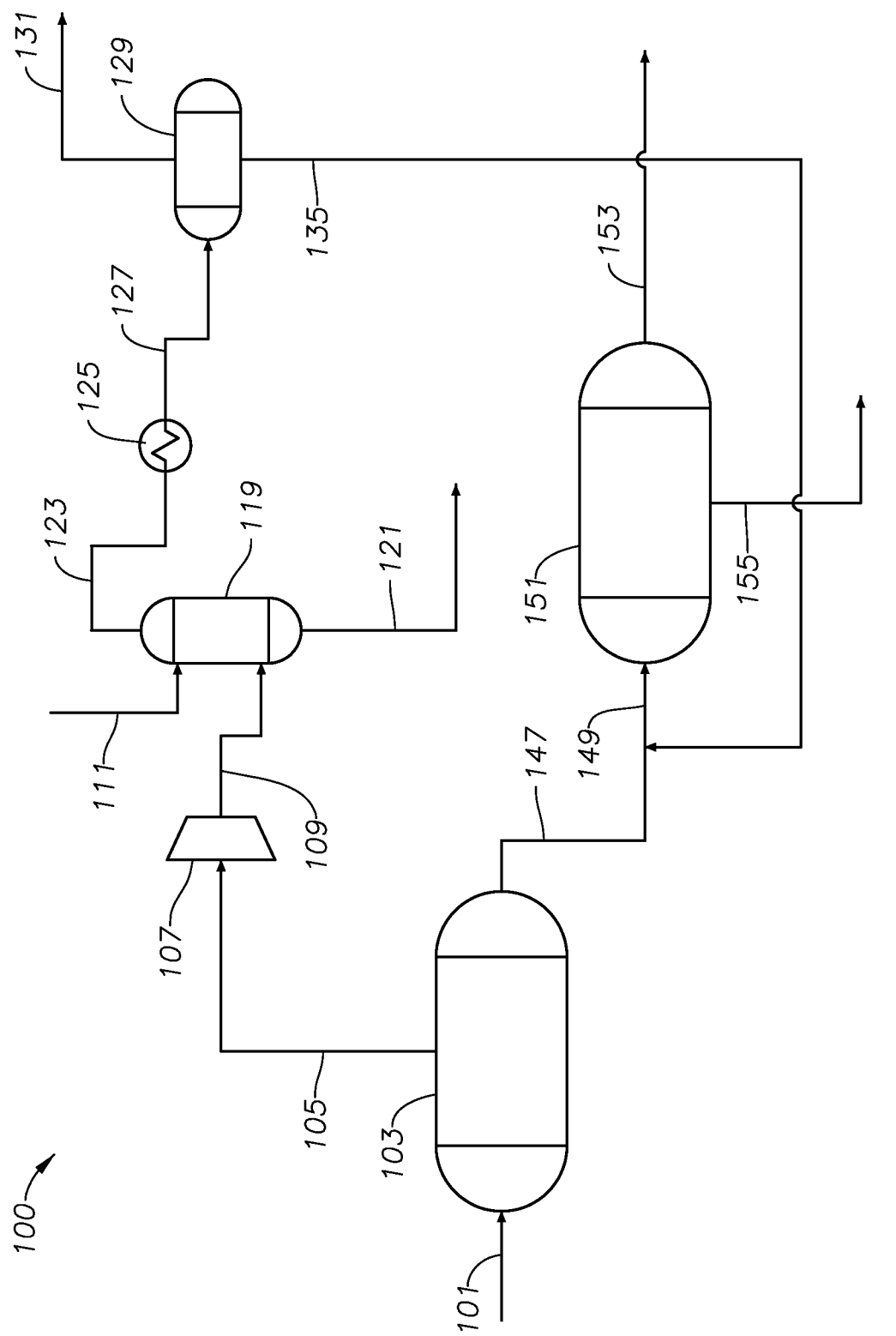
FIG. 1 is a process diagram of a GOSP system using waste heat, according to an embodiment.

Referring to FIG. 1, GOSP system using waste heat 100 is depicted. Inlet crude stream 101, containing raw crude oil contaminated with water, salts, and other dissolved solids, is introduced to gas oil separator vessel 103 capable of separating gas from the oil. Gas oil separator vessel 103 can be a production trap, such as a high pressure production trap or a low pressure production trap, or can be a degassing tank. Optionally, gas oil separator vessel 103 can separate water from oil and gas, and generate a waste water stream (not shown). Crude desalting feed stream 147 is removed from gas oil separator vessel 103, and contains degassed crude. Gas stream 105 is removed from gas oil separator vessel 103. Gas stream 105 contains gaseous hydrocarbons separated from crude oil, including methane, ethane, propane, and C4+ hydrocarbons. Gas stream 105 is introduced to gas compressor 107, which compresses the gas generating compressed gas stream 109. Gas compressor 107 generates waste heat during compression. Thus, compressed gas stream 109 has a higher temperature than gas stream 105. Compressed gas stream 109 is introduced to water separation vessel 119. High salinity stream 111 is also introduced to water separation vessel 119. High salinity stream 111 can be any type of wastewater stream containing water with other contaminants associated with crude processing, including produced water and water separated from crude in the production traps, production separators, dehydrators, or desalters. In some embodiments, high salinity stream 111 contains hydrocarbons. In some embodiments, high salinity stream 111 is desalting vessel wash water stream 155. In preferred embodiments, high salinity stream 111 contains only the formation water and produced water associated with the crude and separated from the production traps, dehydrators, or desalters in order to avoid contaminating the gas streams.

Water separation vessel 119 can be any type of vessel capable of directly contacting compressed gas stream 109 with high salinity stream 111 such that heat is directly transferred from compressed gas stream 109 to high salinity stream 111. Water separation vessel 119 can be made of carbon steel, internally coated to minimize corrosion. Alternately, water separation vessel 119 can be made of corrosion-resistant material. As heat is transferred, water evaporates, turning to water vapor, while salt and other dissolved solids remain dissolved within the liquid phase, or are precipitated out as solids. Water separation vessel 119 allows for the separation of excess water and dissolved solids, or the precipitated solids, from the gas components, including the compressed gas and the water vapor. Waste stream 121, containing excess water and dissolved or precipitated solids and a high TDS level than high salinity stream 111 exits water separation vessel 119. In some embodiments where compressed gas stream 109 contains hydrocarbons, the hydrocarbons can similarly be transformed to a gaseous state. In some embodiments, water separation vessel 119 is a humidifier. In further embodiments with the humidifier, high salinity stream 111 travels downward, flowing countercurrent to compressed gas stream 109. In some embodiments, water separation vessel 119 is a gas/liquid contacting tower.

Saturated gas stream 123 exits water separation vessel 119. Saturated gas stream 123 contains gaseous hydrocarbons and water vapor. Saturated gas stream 123 does not need to be fully saturated, but can be partially saturated with water vapor. Saturated gas stream 123 is introduced to aftercooler 125. Aftercooler 125 can be any type of equipment capable of reducing the temperature of saturated gas stream 123, including coolers and heat exchangers. Aftercooler 125 cools saturated gas stream 123 to a low enough temperature that the water vapor condenses. Advantageously, heavy hydrocarbons such as heavier condensates that were heated in the stream can also be condensed in aftercooler 125, which can be recycled back to the process resulting in an improved crude yield. Cooled saturated gas stream 127 exits aftercooler 125 and is introduced to knockout drum 129. Knockout drum 129 can be any type of vessel capable of separating liquid from gaseous streams. In some embodiments, knockout drum 129 is a three-phase separator. Knockout drum 129 generates export gas stream 131, containing gaseous hydrocarbons. Export gas stream 131 can be further treated. Knockout drum 129 also generates low salinity water stream 135. Low salinity water stream 135 contains low TDS water condensed from cooled saturated gas stream 127. In some embodiments, low salinity water stream 135 has a TDS concentration of less than 300 ppm, alternately less than 250 ppm, alternately less than 200 ppm, and alternately less than 150 ppm.

Low salinity water stream 135 is recycled to the GOSP desalter system. Low salinity water stream 135 is mixed with crude desalting feed stream 147, generating mixed desalting feed stream 149. A mixing valve (not shown) can be used to mix the streams. Mixed desalting feed stream 149 is introduced to desalting vessel 151. Desalting vessel 151 can be any vessel capable of contacting wash water with oil, and separating the wash water phase from the oil phase, thus removing dissolved solids, including salt, from the crude oil. In some embodiments, desalting vessel 151 is a desalter or a dehydrator. Desalting vessel 151 generated desalted crude stream 153 and desalting vessel wash water stream 155. Desalting vessel wash water stream 155 can be used as high salinity stream 111.

Figure 2:
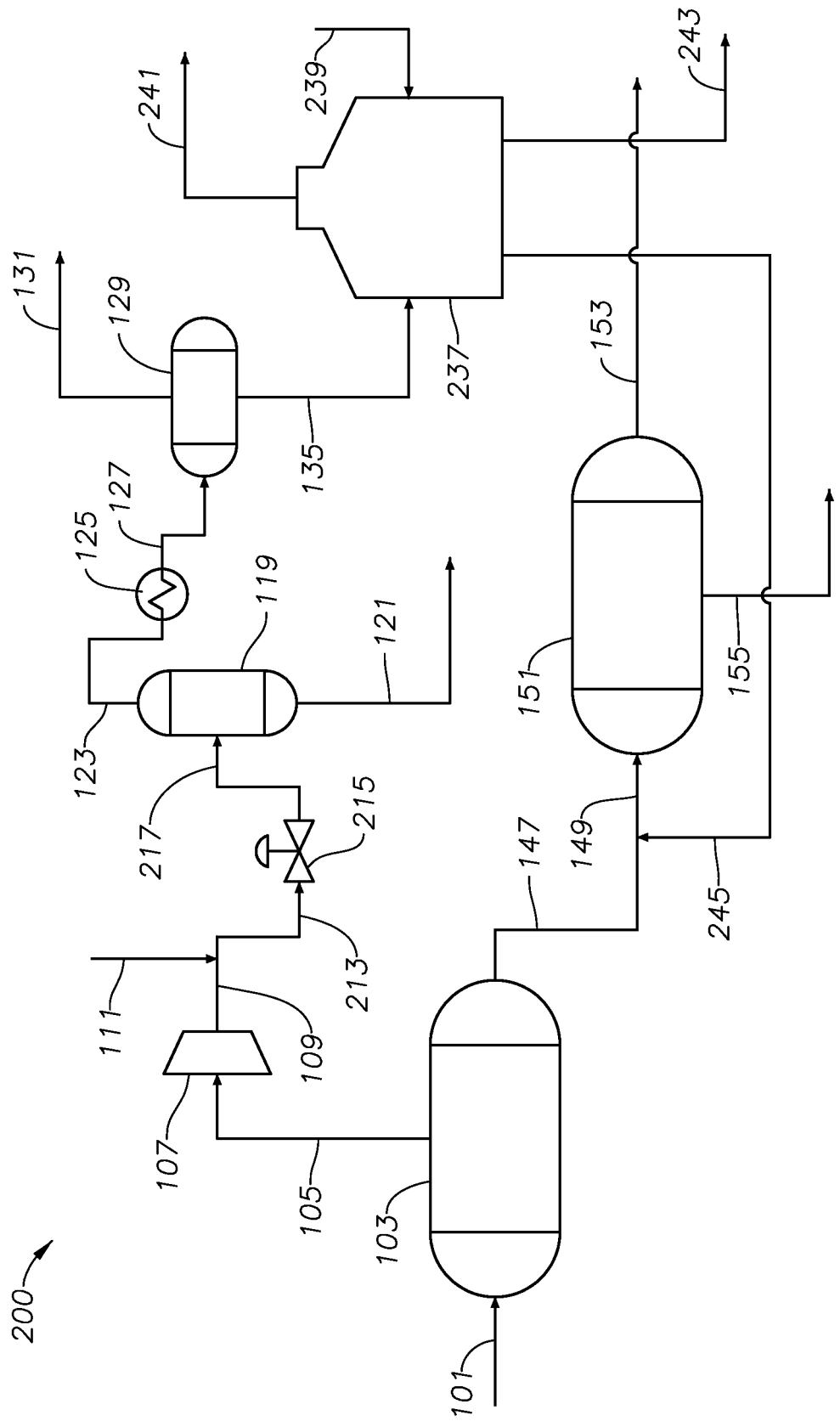
FIG. 2 is a process diagram of a GOSP system using waste heat and in-line injection, according to an embodiment.

Referring to FIG. 2, GOSP system using waste heat and inline injection 200 is shown, and shares many of the same elements and characteristics as GOSP system using waste heat 100. After compressed gas stream 109 exits gas compressor 107, high salinity stream 111 is introduced to compressed gas stream 109 generating combined stream 213. Combined stream 213 is introduced to mixing valve 215. Mixing valve 215 can be any type of valve or inline device capable of adding turbulence to a stream resulting in mixing. Advantageously, combining high salinity stream 111 with compressed gas stream 109 into combined stream 213 can allow for a better gas water separation in water separation vessel 119 and less salt water carry-over into the gas streams downstream. Mixed stream 217 exits mixing valve 215. Mixed stream 217 is introduced to water separation vessel 119. In some embodiments, water separation vessel 119 is a flash vessel. In some embodiments, water separation vessel 119 is a hydrocyclone, which uses centripetal force within a vortex to separate particles from fluids.

After separation in knockout drum 129, low salinity water stream 135 is introduced to low salinity tank 237. Low salinity tank 237 can be any type of vessel or tank capable of storing water. Low salinity tank 237 features a vent from which tank vent stream 241, containing gaseous hydrocarbons, is removed, preventing contaminated from hydrocarbons in other industrial units. Advantageously, low salinity tank 237 allows for storage of treated, low salinity water for use in various places in the plant. Additionally, low salinity tank 237 allows for a surge flow protection and further conservation of water. Residual low salinity water stream 239 can be added to low salinity tank 237. Residual low salinity water stream 239 can come from other low salinity and low TDS water stream sources such as boiler feed water blow down, water from other compressor suction knockout drums, and condensed water from gas pipelines.

Industrial use stream 243 is removed from low salinity water tank 237, and can be used for a variety of water uses in processes. Industrial processes can include desalter wash water and dehydrator wash water. Desalting wash water feed stream 245 is also removed from low salinity water tank 237. Desalting wash water feed stream 245 is introduced to crude desalting feed stream 147, generating mixed desalting feed stream 149. A mixing valve (not shown) can be used to ensure thorough mixing.

Figure 3:
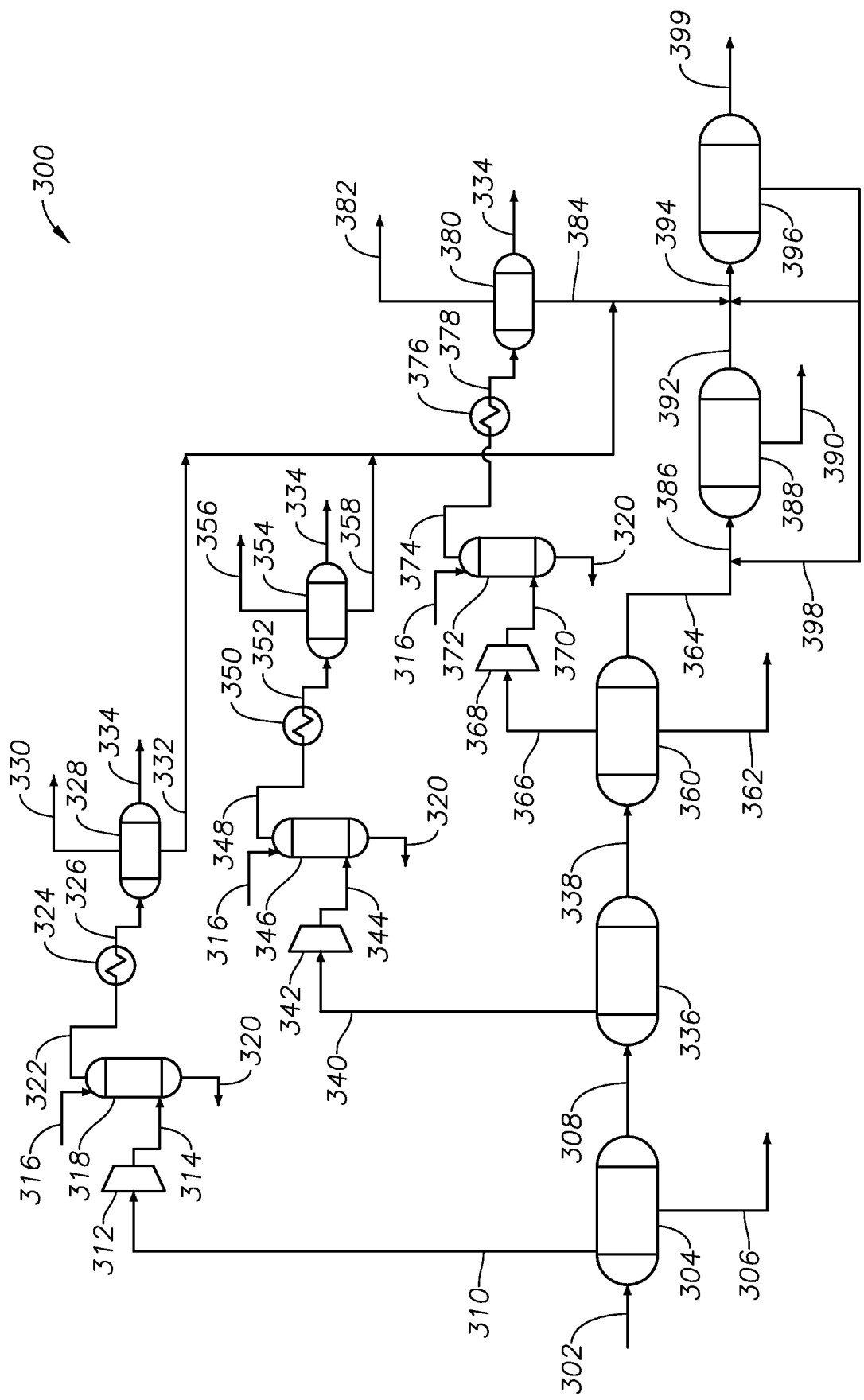
FIG. 3 is a process diagram of a three stage GOSP system using waste heat, according to an embodiment.

Referring to FIG. 3, three stage GOSP system using waste heat 300 is shown, and shares many of the same elements and characteristics as GOSP system using waste heat 100. Inlet crude stream 302 is introduced to high pressure production trap 304. High pressure production trap 304 can operate in a temperature range from 75° F. to 155° F., and in a pressure range from 130 psig to 170 psig. Inlet crude stream 302 can be a raw or untreated crude oil stream, or can have undergone some prior treatment. High pressure production trap 304 can be any type of vessel operating at a pressure such that gaseous hydrocarbons are separated from the crude stream. High pressure waste water stream 306 is removed from high pressure production trap 304, and can be used as high salinity stream 316, or can be treated or disposed. High pressure crude stream 308 exits high pressure production trap 304, and contains crude oil with lower concentrations of dissolved and volatile gases, and water, than inlet crude stream 302. High pressure gas stream 310 is removed from high pressure production trap 304, and contains gaseous hydrocarbons. High pressure gas stream 310 can be in the temperature range of 75° F. to 155° F., and a pressure range of 130 psig to 175 psig.

High pressure gas stream 310 is introduced to first compressor 312, which compresses the gas generating heat. Compressed high pressure gas stream 314 is generated from first compressor 312. Compressed high pressure gas stream 314 can be in a temperature range of 205° F. to 295° F., and a pressure range of 415 psig to 505 psig. Compressed high pressure gas stream 314 is introduced to the lower portion of first humidifier 318. High salinity stream 316 is introduced to the upper portion of first humidifier 318. High salinity stream 316 contains water with a high level of TDS. First humidifier 318 includes a sprayer (not shown) which disperses high salinity stream 316 through the hot gas, allowing for great dispersion and water evaporation. First humidifier 318 allows for water to vaporize, leaving behind the dissolved solids in a concentrated waste water stream. Waste stream 320 is removed from the bottom portion of first humidifier 318, containing water, precipitated and dissolved solids, and having a higher TDS level than high salinity stream 316. First saturated gas stream 322 is also generated from first humidifier 318, and contains water vapor and gaseous hydrocarbons. First saturated gas stream 322 does not need to be fully saturated, but can be partially saturated.

First saturated gas stream 322 is introduced to first aftercooler 324, which can be any type of equipment capable of cooling a gas stream. Cooled first saturated gas stream 326 exits first aftercooler 324, and is introduced to first knockout drum 328. In some embodiments, the temperature of cooled first saturated gas stream 326 is in the range of 95° F. to 135° F. First knockout drum 328 can be any type of vessel capable of allowing for three-phase separation of gases, hydrocarbon liquids, and water based liquids. First export gas stream 330 is generated from first knockout drum 328, and contains gaseous hydrocarbons that can be further treated. Condensate 334 is also generated from first knockout drum 328, and contains liquefied hydrocarbon condensate. Hydrocarbon condensate can include C3, C4, and C5 compounds, and trace amounts of methane, ethane, hydrogen sulfide, nitrogen, and carbon dioxide. First low salinity water stream 332 is generated from first knockout drum 328, and contains water with low TDS levels less than 200 ppm.

High pressure crude stream 308 is introduced to low pressure production trap 336. Low pressure production trap 336 can be any type of vessel operating at a pressure such that gaseous hydrocarbons are separated from the crude stream, but operates at a lower pressure than high pressure production trap 304. Low pressure production trap 336 can operate in a temperature range of 75° F. to 105 F, and a pressure range of 30 psig to 75 psig. Optionally, low pressure production trap 336 can separate water from the crude oil and generate a wastewater stream (not shown), including produced water. Low pressure crude stream 338 is generated from low pressure production trap 336, containing crude oil with less dissolved and entrained gases than high pressure crude stream 308.

Low pressure gas stream 340 is generated from low pressure production trap 336. Low pressure gas stream 340 contains gaseous hydrocarbons. Low pressure gas stream 340 can be in a temperature range of 95° F. to 155° F., and a pressure range of 30 psig to 75 psig. Low pressure gas stream 340 is introduced to second compressor 342, which compresses the gas generating heat. Compressed low pressure gas stream 344 is generated from second compressor 342. Compressed low pressure gas stream 344 can have a temperature range of 205° F. to 295° F., and a pressure range of 140 psig to 185 psig. Compressed low pressure gas stream 344 is introduced to the lower portion of second humidifier 346. High salinity stream 316 is introduced to the upper portion of second humidifier 346. Second humidifier 346 is set up similarly to first humidifier 318. Waste stream 320 is removed from the bottom portion of second humidifier 346. Second saturated gas stream 348 is also generated from second humidifier 346, and contains water vapor and gaseous hydrocarbons. Second saturated gas stream 348 does not need to be fully saturated, but can be partially saturated.

Second saturated gas stream 348 is introduced to second aftercooler 350. Second aftercooler 350 can have the same characteristics as first aftercooler 324. Cooled second saturated gas stream 352 is generated from second aftercooler 350. Cooled second saturated gas stream 352 is introduced to second knockout drum 354. In some embodiments, the temperature of cooled second saturated gas stream 352 is in the range of 95° F. to 135° F. Second knockout drum 354 can have the same characteristics as first knockout drum 328. Second knockout drum 354 can operate in a temperature range of 95° F. to 155° F., and a pressure range of 30 psig to 75 psig. Second export gas stream 356 is removed from second knockout drum 354. Second export gas stream 356 can be introduced to high pressure gas stream 310. Condensate 334 is also generated from second knockout drum 354. Second low salinity water stream 358 is generated from second knockout drum 354. Second low salinity water stream 358 is mixed with first low salinity water stream 332. Optionally, second low salinity water stream 358 can be separately handled.

Low pressure crude stream 338 is introduced to low pressure degassing tank 360. Low pressure degassing tank 360 can be any type of vessel capable of holding and separating crude oil from gaseous hydrocarbons. Low pressure degassing tank 360 can operate in a temperature range of 95° F. to 155° F., and a pressure range of 0 psig to 20 psig.

In some embodiments, low pressure degassing tank 360 operates at atmospheric pressure. Optionally, low pressure degassing tank 360 includes capabilities to separate and remove degassing tank waste water stream 362, containing water. Degassing tank waste water stream 362 can be used as high salinity stream 316. Degassing tank crude stream 364 is generated from low pressure degassing tank 360.

Degassing tank gas stream 366 is generated from low pressure degassing tank 360. Degassing tank gas stream 366 contains gaseous hydrocarbons. Degassing tank gas stream 366 can be in a temperature range of 95° F. to 155° F., and a pressure range of 0 psig to 20 psig. Degassing tank gas stream 366 is introduced to third compressor 368. Third compressor 368 compresses the gas generating heat. Compressed degassing tank gas stream 370 exits third compressor 368. Compressed degassing tank gas stream 370 can be in a temperature range of 205° F. to 295° F., and a pressure range of 40 psig to 85 psig. Compressed degassing tank gas stream 370 is introduced to third humidifier 372. Third humidifier 372 can be similarly set up like first humidifier 318. High salinity stream 316 is introduced to third humidifier 372. Waste stream 320 is removed from third humidifier 372. Degassing tank saturated gas stream 374 is removed from third humidifier 372 containing gaseous hydrocarbons and water vapor. Degassing tank saturated gas stream 374 is introduced to third aftercooler 376. Third aftercooler 376 can be similarly set up as first aftercooler 324.

Cooled third saturated gas stream 378 is generated from third aftercooler 376. Cooled third saturated gas stream 378 is introduced to third knockout drum 380. Third knockout drum 380 can have similar characteristics as first knockout drum 328. In some embodiments, the temperature of cooled third saturated gas stream 378 is in the range of 95° F. to 135° F. Third knockout drum 380 can operate in a temperature range of 95° F. to 155° F., and a pressure range of 0 psig to 15 psig. Condensate 334 is removed from third knockout drum 380. Third export gas stream 382 containing gaseous hydrocarbons is removed from third knockout drum 380, and can be introduced to high pressure gas stream 310. Third low salinity water stream 384 is also generated from third knockout drum 380, and contains water with low levels of TDS. First low salinity water stream 332 and second low salinity water stream 358 can be mixed with third low salinity water stream 384.

Desalter wash water stream 398 is introduced to degassing tank crude stream 364, generating dehydrator feed stream 386. A mixing valve (not shown) can be used to thoroughly mix the streams. Dehydrator feed stream 386 containing crude oil, water, and some dissolved solids such as salt, is introduced to dehydrator unit 388. Dehydrator unit 388 can be any type of dehydrator or desalting vessel that allows for the mixing and settling of crude oil and wash water, resulting in the removal of salt and other dissolved solids from the crude oil. Dehydrator unit 388 can operate at a temperature range of 115° F. to 185° F., and a pressure range of 85 psig to 205 psig. Dehydrator unit 388 generates dehydrator waste water stream 390, containing water and dissolved solids, including salt. Dehydrator unit 388 also generates crude desalter feed stream 392 containing crude oil.

Third low salinity water stream 384 and desalter wash water stream 398 are introduced to crude desalter feed stream 392, generating mixed desalter feed stream 394. Control valves (not shown) can control how much, if any, water from third low salinity water stream 384 and desalter wash water stream 398 are introduced to crude desalter feed stream 392. A mixing valve (not shown) can be used to thoroughly combine of mixed desalter feed stream 394. Mixed desalter feed stream 394 is introduced to desalter unit 396. Desalter unit 396 can be any type of vessel capable of contacting wash water with oil, and separating the wash water phase from the oil phase, thus removing dissolved solids, including salt, from the crude oil. Desalter unit 396 can operate at a temperature range of 115° F. to 185° F., and a pressure range of 85 psig to 205 psig. Desalter unit 396 generates desalter wash water stream 398 containing wash water with high TDS levels. Desalter unit 396 also generates desalter crude stream 399, which can be treated further in GOSP processes such as stabilizer columns. In some embodiments, desalter crude stream 399 has a salt content of no more than 10 lbs of salt/1000 barrels, and a basic sediment and water (BS&W) level of no more than 0.3 volume percent (vol %).

Figure 4:
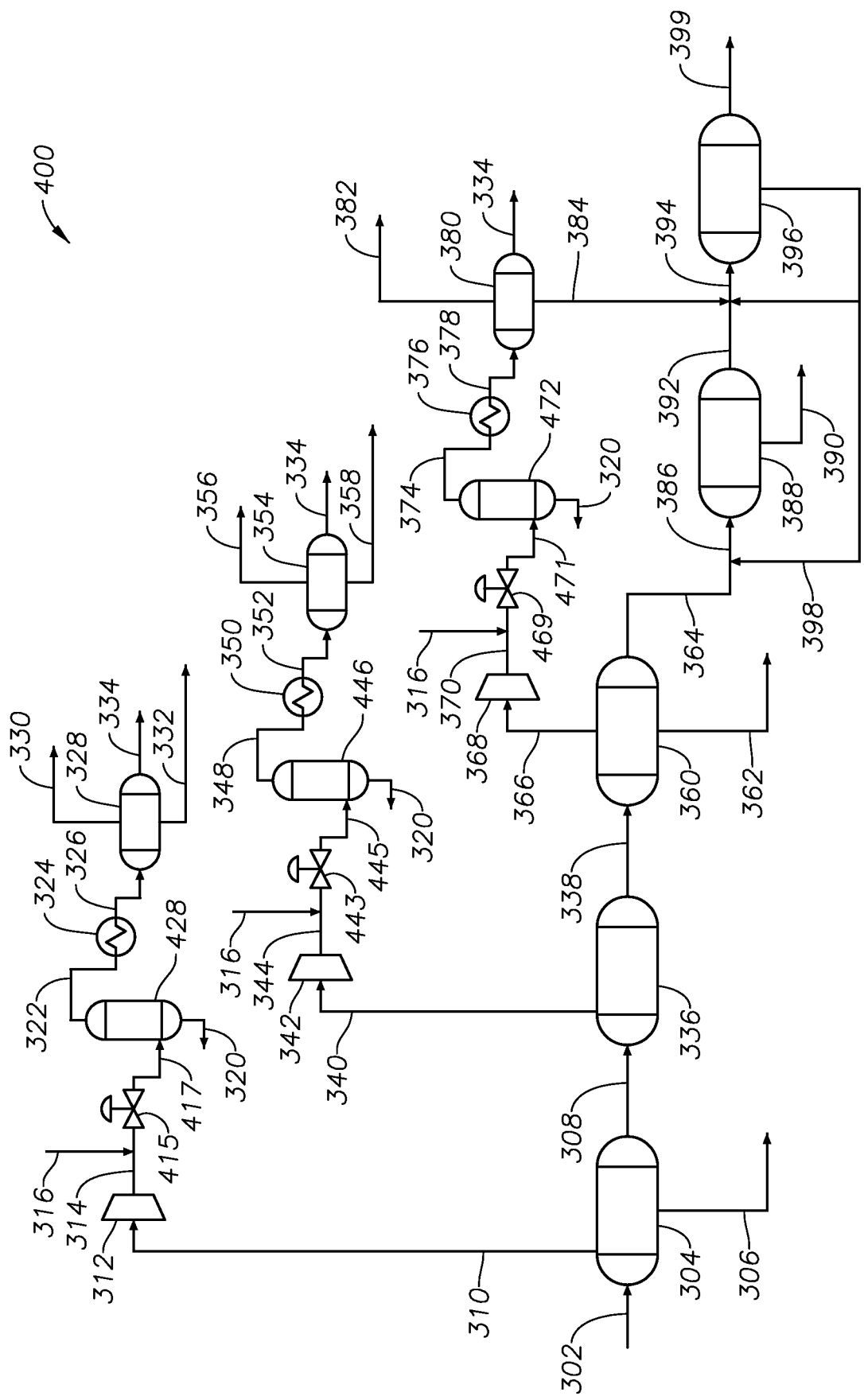
FIG. 4 is a process diagram of a three stage GOSP system using waste heat and in-line injection, according to an embodiment.

Referring to FIG. 4, three stage GOSP system using waste heat and inline injection 400 is shown, and shares many of the same elements and characteristics as three stage GOSP system using waste heat 300. High salinity stream 316 is introduced to compressed high pressure gas stream 314, which is introduced to first mixing valve 415, which can be used to mix the streams. First mixed stream 417 is generated from first mixing valve 415. First mixed stream 417 is introduced to first separation vessel 428. In some embodiments, first separation vessel 428 is a flash vessel. In some embodiments, first separation vessel 428 is a hydrocyclone.

Similarly, high salinity stream 316 is introduced to compressed low pressure gas stream 344, which is introduced to second mixing valve 443, which can be used to mix the streams. Second mixed stream 445 is generated from second mixing valve 443. Second mixed stream 445 is introduced to second separation vessel 446. In some embodiments, second separation vessel 446 is a flash vessel. In some embodiments, second separation vessel 446 is a hydrocyclone.

High salinity stream 316 is introduced to compressed degassing tank gas stream 370, which is introduced to third mixing valve 469, which can be used to mix the streams. Third mixed stream 471 is generated from third mixing valve 469. Third mixed stream 471 is introduced to third separation vessel 472. In some embodiments, third separation vessel 472 is a flash vessel. In some embodiments, third separation vessel 472 is a hydrocyclone.

Although the present disclosure has been described in detail, it should be understood that various changes, substitutions, and alterations can be made without departing from the principle and scope of the disclosure. Accordingly, the scope of the present disclosure should be determined by the following claims and their appropriate legal equivalents.

The singular forms "a," "an," and "the" include plural referents, unless the context clearly dictates otherwise.

Optional or optionally means that the subsequently described event or circumstances can or may not occur. The description includes instances where the event or circumstance occurs and instances where it does not occur.

As used in the specification and in the appended claims, the words "comprise," "has," and "include" and all grammatical variations thereof are each intended to have an open, non-limiting meaning that does not exclude additional elements or steps.

As used throughout the specification and claims, terms such as "first" and "second" are arbitrarily assigned and are merely intended to differentiate between two or more components of an apparatus. It is to be understood that the words "first" and "second" serve no other purpose and are not part of the name or description of the component, nor do they necessarily define a relative location or position of the component. Furthermore, it is to be understood that that the mere use of the term "first" and "second" does not require that there be any "third" component, although that possibility is contemplated under the scope of the present disclosure.

Ranges may be expressed throughout as from about one particular value, or to about another particular value. When such a range is expressed, it is to be understood that another embodiment is from the one particular value or to the other particular value, along with all combinations within said range.

Although the present disclosure has been described in detail, it should be understood that various changes, substitutions, and alterations can be made without departing from the principle and scope of the disclosure. Accordingly, the scope of the present disclosure should be determined by the following claims and their appropriate legal equivalents.

What is claimed is:

1. A system for generating low salinity water for crude oil treatment processes, the system comprising:
    a gas oil separator vessel operable to separate a gas stream comprising gaseous hydrocarbons from an inlet crude stream;
    a gas compressor fluidly connected to the gas oil separator vessel, operable to compress the gas stream to generate a compressed gas stream;
    a water separation vessel fluidly connected to the gas compressor, operable to contact the compressed gas stream with a high salinity stream comprising water and salt such that heat transfers from the compressed gas stream to the high salinity stream wherein water from the high salinity stream evaporates generating water vapor, such that the compressed gas stream nears saturation with water such that the water separation vessel generates a waste stream comprising water and salt and a saturated gas stream comprising water vapor and gaseous hydrocarbons;
    an aftercooler fluidly connected to the water separation vessel operable to cool the saturated gas stream to generate a cooled saturated gas stream; and
    a knockout drum fluidly connected to the aftercooler operable to separate condensed water from the cooled saturated gas stream to generate an export gas stream and a low salinity water stream.

2. The system of claim 1, further comprising a mixing valve fluidly connected to the gas compressor and the water separation vessel operable to mix the high salinity stream and the compressed gas stream to generate a mixed stream before the mixed stream is introduced to the water separation vessel.

3. The system of claim 1, further comprising a low salinity tank fluidly connected to the knockout drum operable to collect the low salinity water stream and a residual low salinity water stream.

4. The system of claim 1, further comprising a desalting vessel fluidly connected to the gas oil separator vessel, operable to accept a mixed desalting feed stream comprising a desalting wash water feed stream and a crude desalting feed stream, the crude desalting feed stream generated from the gas oil separator vessel, the desalting vessel further operable to generate a desalted crude stream and a desalting vessel wash water stream.

5. The system of claim 4, wherein the desalting wash water feed stream comprises the low salinity water stream.

6. The system of claim 4, wherein the high salinity stream comprises the desalting vessel wash water stream.

7. The system of claim 1, wherein the water separation vessel is selected from the group consisting of: a humidifier, a flash vessel, a hydrocyclone, and combinations of the same.

8. A system for crude oil treatment, the system comprising:
- a high pressure production trap operable to separate a high pressure gas stream comprising gaseous hydrocarbons from an inlet crude stream to generate a high pressure crude stream;
- a low pressure production trap fluidly connected to the high pressure production trap, the low pressure production trap operable to separate a low pressure gas stream comprising gaseous hydrocarbons from the high pressure crude stream to generate a low pressure crude stream and the low pressure gas stream;
- a low pressure degassing tank fluidly connected to the low pressure production trap, the low pressure degassing tank operable to separate a degassing tank gas stream comprising gaseous hydrocarbons from the low pressure crude stream;
- a first compressor fluidly connected to the high pressure production trap, the first compressor operable to compress the high pressure gas stream to generate a compressed high pressure gas stream;
- a first separation vessel fluidly connected to the first compressor, the first separation vessel operable to contact a first high salinity stream comprising water and salt and the compressed high pressure gas stream such that water vapor is created to generate a first waste stream comprising water and salt and a first saturated gas stream comprising water vapor and gaseous hydrocarbons;
- a first aftercooler fluidly connected to the first separation vessel, the first aftercooler operable to cool the compressed high pressure gas stream to generate a cooled first saturated gas stream;
- a first knockout drum fluidly connected to the first aftercooler, the first knockout drum operable to separate a first low salinity water stream comprising water from the cooled first saturated gas stream to generate a first export gas stream comprising gaseous hydrocarbons;
- a second compressor fluidly connected to the low pressure production trap, the second compressor operable to compress the low pressure gas stream to generate a compressed low pressure gas stream;
- a second separation vessel fluidly connected to the first compressor, the first separation vessel operable to contact a second high salinity stream comprising water and salt and the compressed low pressure gas stream such that water vapor is created to generate a second waste stream comprising water and salt and a second saturated gas stream comprising water vapor and gaseous hydrocarbons;
- a second aftercooler fluidly connected to the second separation vessel, the second aftercooler operable to cool the compressed low pressure gas stream to generate a cooled second saturated gas stream;
- a second knockout drum fluidly connected to the second aftercooler, the second knockout drum operable to separate a second low salinity water stream comprising water from the cooled second saturated gas stream to generate a second export gas stream comprising gaseous hydrocarbons;
- a third compressor fluidly connected to the low pressure degassing tank, the third compressor operable to compress the degassing tank gas stream to generate a compressed degassing tank gas stream;
- a third separation vessel fluidly connected to the third compressor, the third separation vessel operable to contact a third salinity stream comprising water and salt and the compressed degassing tank gas stream such that water vapor is created to generate a third waste stream comprising water and salt and a third saturated gas stream comprising water vapor and gaseous hydrocarbons;
- a third aftercooler fluidly connected to the third separation vessel, the third aftercooler operable to cool the compressed degassing tank gas stream to generate a cooled third saturated gas stream; and
- a third knockout drum fluidly connected to the third aftercooler, the third knockout drum operable to separate a third low salinity water stream comprising water from the cooled third saturated gas stream to generate a third export gas stream comprising gaseous hydrocarbons.

9. The system of claim 8, further comprising:
- a dehydrator, fluidly connected to the low pressure degassing tank, the dehydrator operable to accept a dehydrator feed stream comprising a desalter wash water stream and the degassing tank crude stream, the dehydrator further operable to generate a crude desalter feed stream and a dehydrator waste water stream such that salts and dissolved solids from the degassing tank crude stream are removed from the degassing tank crude stream and transferred to the dehydrator waste water stream; and
- a desalter unit, fluidly connected to the dehydrator unit, the desalter unit operable to accept a mixed desalter feed stream comprising the first low salinity stream, the second low salinity stream, the third low salinity stream, the desalter wash water stream, and the crude desalter feed stream, the desalter unit further operable to generate a desalter crude stream and the desalter wash water stream such that salts and dissolved solids from the crude desalter feed stream are removed from the crude desalter feed stream and transferred to the desalter wash water stream.

10. The system of claim 9, further wherein the second export gas stream and the third export gas stream are recycled to the first compressor.

11. The system of claim 8, further comprising:
- a first mixing valve operable to mix the first high salinity stream with the compressed high pressure gas stream before introduction to the first separation vessel;
- a second mixing valve operable to mix the second high salinity stream with the compressed low pressure gas stream before introduction to the second separation vessel; and
- a third mixing valve operable to mix the third high salinity stream with the compressed degassing tank gas stream before introduction to the third separation vessel.

12. The system of claim 8, further wherein the first separation vessel, the second separation vessel, and the third separation vessel are each selected from the group consisting of: a humidifier, a flash vessel, a hydrocyclone, and combinations of the same.

* * * * *